US012648670B2

(12) United States Patent
Home

(10) Patent No.: US 12,648,670 B2
(45) Date of Patent: Jun. 9, 2026

(54) THERMAL-LOSS-REDUCED AND TEMPERATURE-HOMOGENIZATION-EFFECT-ENHANCED OVEN

(71) Applicant: GRAND HALL ENTERPRISE CO., LTD., Taipei (TW)

(72) Inventor: William Home, Taipei (TW)

(73) Assignee: GRAND HALL ENTERPRISE CO., LTD., Taipei (TW)

( * ) Notice: Subject to any disclaimer, the term of this patent is extended or adjusted under 35 U.S.C. 154(b) by 354 days.

(21) Appl. No.: 18/596,593

(22) Filed: Mar. 5, 2024

(65) Prior Publication Data

US 2025/0280995 A1     Sep. 11, 2025

(51) Int. Cl.
*A47J 37/06* (2006.01)

(52) U.S. Cl.
CPC ................................. *A47J 37/0629* (2013.01)

(58) Field of Classification Search
CPC .................................................. A47J 37/0629
See application file for complete search history.

(56) References Cited

U.S. PATENT DOCUMENTS

| | | | | |
|---|---|---|---|---|
| 2,744,994 A | * | 5/1956 | Bruckner | A47J 37/0635 |
| | | | | 219/405 |
| 5,536,518 A | * | 7/1996 | Rummel | A47J 37/074 |
| | | | | 126/41 R |
| 6,114,666 A | * | 9/2000 | Best | A47J 37/0786 |
| | | | | 126/39 BA |
| 7,301,127 B1 | * | 11/2007 | Derridinger, Jr. | A47J 37/0709 |
| | | | | 219/386 |
| 10,582,576 B2 | * | 3/2020 | Specht | H05B 6/763 |
| 12,339,009 B2 | * | 6/2025 | Jiang | A23B 4/044 |
| 2008/0210214 A1 | * | 9/2008 | Wade | A47J 37/0786 |
| | | | | 126/299 R |

* cited by examiner

*Primary Examiner* — Jesse S Bogue
(74) *Attorney, Agent, or Firm* — Leong C. Lei

(57)     ABSTRACT

A thermal-loss-reduced and temperature-homogenization-effect-enhanced oven includes a liftable front cover, a fixed rear cover, an oven top, and an operation panel. The liftable front cover has a bottom positionable on a first temperature barrier silicon strip to reduce heat conducted from the oven top to an operation area of the operation panel to reduce a thermal loss of the oven top, and to effectively reduce an external environmental influence. The second temperature barrier silicon strip reduces a cover top heat release gap between the liftable front cover and the fixed rear cover to reduce a thermal loss and an external environmental influence of the oven, and an elastic restoration force of the second temperature barrier silicon strip reduces deformation between the liftable front cover and the fixed rear cover caused by a high temperature to thereby avoid excessive tightness in closing the oven cover.

4 Claims, 4 Drawing Sheets

THERMAL-LOSS-REDUCED AND TEMPERATURE-HOMOGENIZATION-EFFECT-ENHANCED OVEN

BACKGROUND OF THE INVENTION

(a) Technical Field of the Invention

The present invention relates to an oven, and more particularly to a thermal-loss-reduced and temperature-homogenization-effect-enhanced oven that includes elastic heat-resistant projecting temperature barrier silicon strips respectively arranged between an oven top and an operation panel and between a liftable front cover and a fixed rear cover top edge, and a roasting tray including a plurality of hot air venting openings.

(b) Description of the Prior Art

Taking food is necessary for keeping lives, and nourishing body is a necessary and important daily activity. Feeding has to be done daily and food must be delicious to be good for eating and enjoy of eating. For this, food material must be well processed and ovens for cooking and utensils for cooking and dinning must be well prepared. Among various ways of cooking, preparing food by means of roasting and grilling is a long-used and commonly popularized way of cooking. Cooking of pure roasting/grilling without preparation for other ways of for example water boiling and steaming, is extremely suitable for small-scale or large-scale outdoor social activities, as hot food can be done very quickly even in an unexpected situation.

People who love to do grilling in living and looking forward to full exploitation of the roasting and grilling performance of roasting ovens are generally unsatisfied with simply-structured roasting oven that simply has an oven top that is made open for ventilation, and for such a reason, cover-liftable roasting ovens have been developed, in which two sides of a liftable front cover are clamped and pivotally mounted to two sides of a fixed rear cover to surround a top side and a periphery of the oven top. Lifting up and then backward rotating the liftable front cover to stack on the fixed rear cover makes the oven top open for easy operation on the oven top, while rotating downward the liftable front cover to the front side of the fixed rear cover makes the oven top totally covered. The oven top can be temporarily covered according to the cooking degree of the food during roasting of food on the oven top, so as to increase the efficiency of heating and cooking the food inside the cover.

However, for various known cover-liftable roasting oven, contact engagement between the oven top and the operation panel top edge and the liftable front cover set in the closed condition is always contact between metals, and this makes heat transferred, through conduction, from the oven top and a front edge of the liftable front cover to the operation panel arranged at a front side of the oven top, leading to a thermal loss and also being influenced by external environment from the front side of the oven, such as wind and external temperature variation, making the oven top hard to implement an order way of temperature rising. Further, this causes a temperature increase of the operation panel that may burn hands, making it hard to touch and operate the operation panel without wearing gloves, particularly for electrically-controlled pushbutton type operation panels that are not mechanical knob type operation panels, the troubles caused by heat transfer through conduction are more prominent and may lead to damage and burn-out of electronic components of the operation panel.

Further, for the various cover-liftable roasting ovens, between a liftable front cover and a fixed rear cover top edge, the liftable front cover and the fixed rear cover that are made in a rigid form by using metal sheets are spaced from each other to form a hot air release gap, so that when closed by the cover, the hot, expanded air inside the cover may rush toward the top of the cover thereby causing permanent rigid deformation in the metal parts, and for example external winds and environmental temperature variation outside the cover causes a relatively large difference relative to the high temperature inside the oven, the temperature-induced deformation on the metal parts may become severe. Once the deformation causes reduction of the hot air release gap, the tightness of the cover closing the oven may be affected, making moving of the liftable front cover unsmooth. Oppositely, if the deformation causes expansion of the hot air release gap, even under the condition of the cover closes the oven top, there is still a large amount of air release from oven top side, leading to a thermal loss and thus reducing the efficiency of heating and cooking food.

SUMMARY OF THE INVENTION

Thus, the present invention provides a thermal-loss-reduced and temperature-homogenization-effect-enhanced oven, of which a first objective is to reduce the thermal loss of an oven top and to effectively reduce an external environmental influence on a front side of the oven to thereby allow the oven top to implement, in an ordered manner, a temperature-increasing operation.

To achieve the aforementioned first objective of the present invention, the present invention provides a thermal-loss-reduced and temperature-homogenization-effect-enhanced oven, which comprises a liftable front cover, a fixed rear cover, an oven top, and an operation panel, wherein the fixed rear cover receives the liftable front cover to movably pivot thereto; the oven top is arranged below the fixed rear cover, at least one heating body being provided under the oven top, the oven top comprising an oven top front edge and at least one roasting tray; and the operation panel is arranged at a front side of the oven top; and specifically, a horizontal gap is present between the operation panel and the oven top front edge, and a first temperature barrier silicon strip is arranged in the horizontal gap, an upper surface of the first temperature barrier silicon strip projecting beyond upper surfaces of the operation panel and the oven top front edge.

As such, a bottom of the liftable front cover is positionable on and pressing against the first temperature barrier silicon strip to define a thermal isolation and sealing structure to reduce heat conducted from the oven top to an operation area of the operation panel to reduce a thermal loss of the oven top, and to effectively reduce an external environmental influence on a front side of the oven to thereby allow the oven top to implement, in an ordered manner, a temperature-increasing operation, while a temperature of the operation panel is kept proper, not burning hand and interfering with operations.

The present invention provides a thermal-loss-reduced and temperature-homogenization-effect-enhanced oven, of which a second objective is to reduce the cover top heat release gap between the liftable front cover and the fixed rear cover to reduce a thermal loss and an external environmental influence of the oven to thereby increase a heating efficiency, and to reduce deformation between the liftable front cover and the fixed rear cover caused by a high temperature to thereby avoid excessive tightness in closing the oven cover.

To achieve the aforementioned second objective of the present invention, the present invention provides a thermal-loss-reduced and temperature-homogenization-effect-enhanced oven, wherein a cover top heat release gap is present between the liftable front cover and the fixed rear cover, and a second temperature barrier silicon strip is arranged in the cover top heat release gap and mounted on a fixed rear cover top edge arranged at a top of the fixed rear cover and adjacent to the liftable front cover.

As such, the second temperature barrier silicon strip reduces the cover top heat release gap between the liftable front cover and the fixed rear cover to reduce a thermal loss and an external environmental influence of the oven to thereby increase a heating efficiency, and an elastic restoration force of the second temperature barrier silicon strip effectively reduces deformation between the liftable front cover and the fixed rear cover caused by a high temperature to thereby avoid excessive tightness in closing the oven cover.

The present invention provides a thermal-loss-reduced and temperature-homogenization-effect-enhanced oven, of which a third objective is to reduce temperature conduction of the oven top, and to compensate a temperature of an area that is not located in a radiating area of the heating body, where the hot air flow is applied for compensation to achieve a temperature homogenization effect.

To achieve the aforementioned third objective, the present invention provides a thermal-loss-reduced and temperature-homogenization-effect-enhanced oven, wherein the roasting tray comprises a single-row straight wavy-pattern heat conduction plate, and the roasting tray comprises the wavy pattern troughs, the wavy pattern troughs being formed with a plurality of hot air venting openings.

As such, the hot air venting openings guides hot airflow to form an air wall between the heating body and the oven top to effectively guide thermal energy, reducing temperature conduction of the oven top, and compensating a temperature of an area that is not located in a radiating area of the heating body, where the hot air flow is applied for compensation to achieve a temperature homogenization effect.

DETAILED DESCRIPTION OF THE PREFERRED EMBODIMENTS

Figure 1:
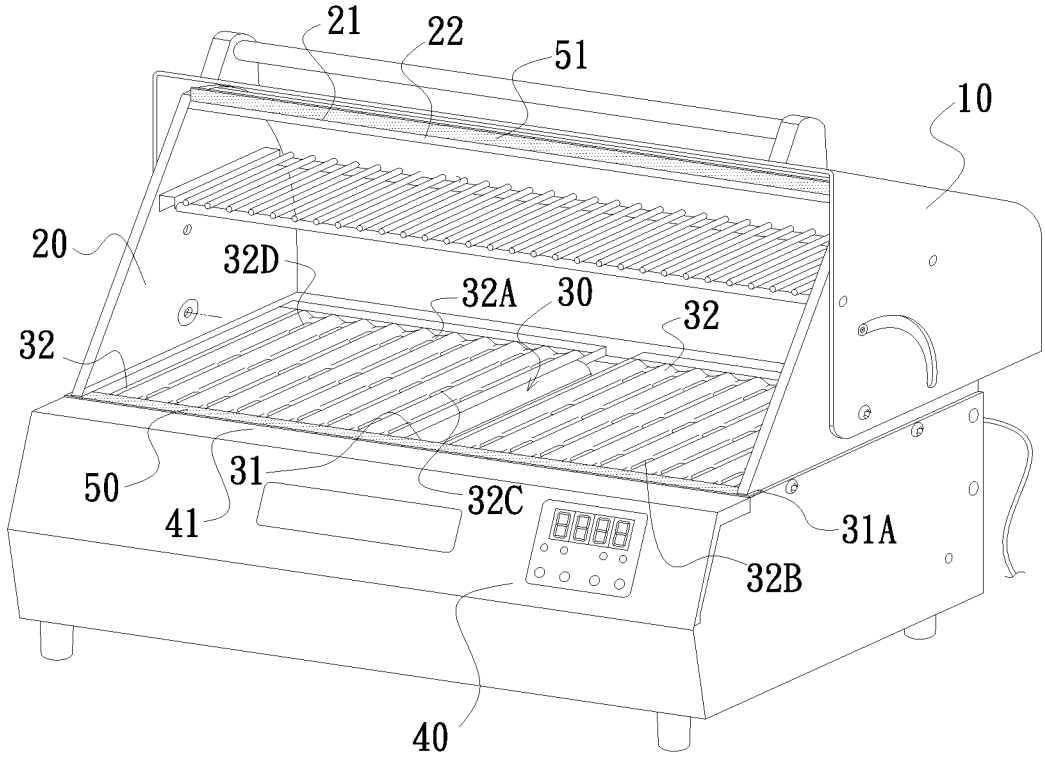
FIG. 1 is a perspective view showing a thermal-loss-reduced and temperature-homogenization-effect-enhanced oven that embodies the present invention.

Referring to FIGS. 1-4, the present invention provides a thermal-loss-reduced and temperature-homogenization-effect-enhanced oven, which comprises a liftable front cover 10, a fixed rear cover 20, an oven top 30, and an operation panel 40. Details are provided as follows:

The fixed rear cover 20 is structured for the liftable front cover 10 to movably pivot thereto.

The oven top 30 is arranged below the fixed rear cover 20, and the oven top 30 is provided on an underside thereof with two heating bodies 33, 34. The oven top 30 comprises thane oven top front edge 31 and two roasting trays 32.

The operation panel 40 is arranged at a front side of the oven top 30.

Specifically, a horizontal gap 31A is formed between the operation panel 40 and the oven top front edge 31, and a first temperature barrier silicon strip 50 is arranged in the horizontal gap 31A. An upper surface of the first temperature barrier silicon strip 50 projects beyond upper surfaces of the operation panel 40 and the oven top front edge 31.

As such, a bottom of the liftable front cover 10 is positionable on and pressing down against the first temperature barrier silicon strip 50 to define a thermal isolation and sealing structure so as to reduce heat conducted from the oven top 30 to an operation area of the operation panel 40 so as to reduce a thermal loss of the oven top 30, and to effectively reduce an external environmental influence on a front side of the oven, such as wind and external temperature variation, thereby allowing the oven top 30 to implement, in an ordered manner, a temperature-increasing operation, while the temperature of the operation panel 40 is made proper, not burning hand and interfering with operations.

Figure 4:
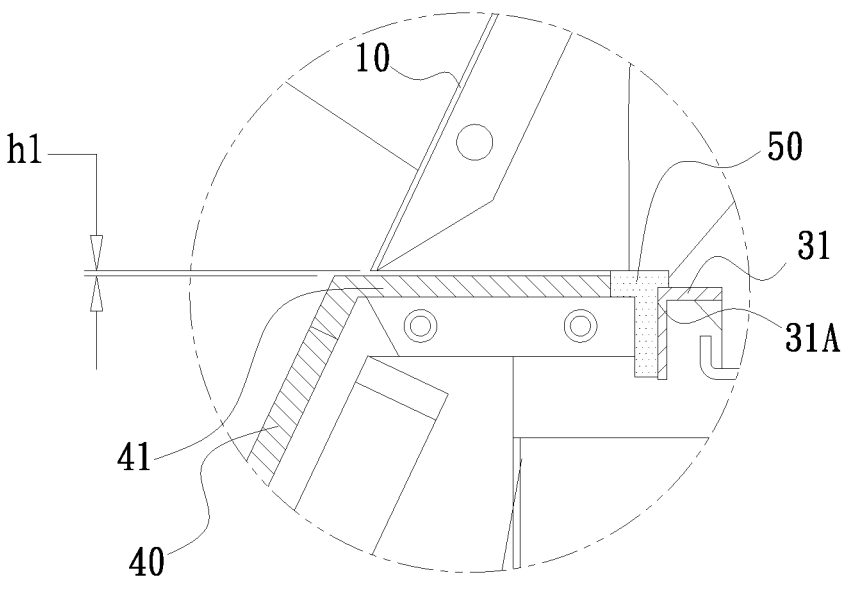
FIG. 4 is an amplified view of a circled portion A of FIG. 3.
Figure 5:
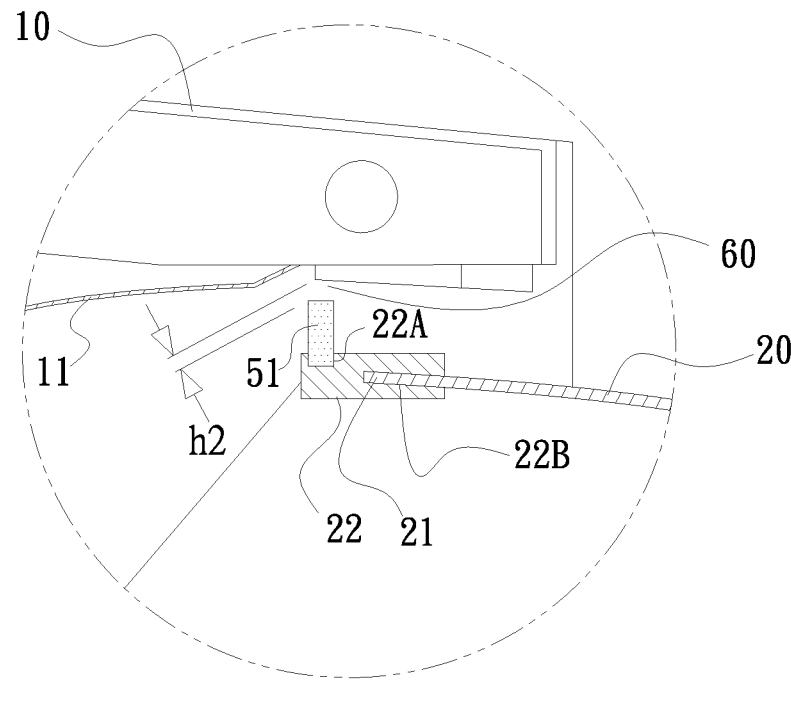
FIG. 5 is an amplified view of a circled portion B of FIG. 3.

As shown in an amplified view provided in FIG. 4, the upper surface of the first temperature barrier silicon strip 50 is higher than the operation panel top edge 41 by a gap height h1.

Referring to FIGS. 1-3 and 5, the present invention provides a thermal-loss-reduced and temperature-homogenization-effect-enhanced oven, and specifically, a cover top heat release gap 60 is formed between the liftable front cover 10 and the fixed rear cover 20, and a second temperature barrier silicon strip 51 is arranged in the cover top heat release gap 60 and mounted on a fixed rear cover top edge 21 arranged at a top of the fixed rear cover 20 and adjacent to the liftable front cover 10.

The second temperature barrier silicon strip 51 reduces the cover top heat release gap 60 between the liftable front cover 10 and the fixed rear cover 20 to reduce a thermal loss and an external environmental influence of the oven, such as wind and external temperature variation, to thereby increase the heating efficiency, and an elastic restoration force of the second temperature barrier silicon strip 51 effectively reduces deformation between the liftable front cover 10 and the fixed rear cover 20 caused by a high temperature to thereby avoid excessive tightness in closing the oven cover.

As shown in an amplified view provided in FIG. 4, the second temperature barrier silicon strip 51 blocks and reduces the cover top heat release gap 60 to a narrow slit h2 to increase a cover-closed heating efficiency.

Figure 2:
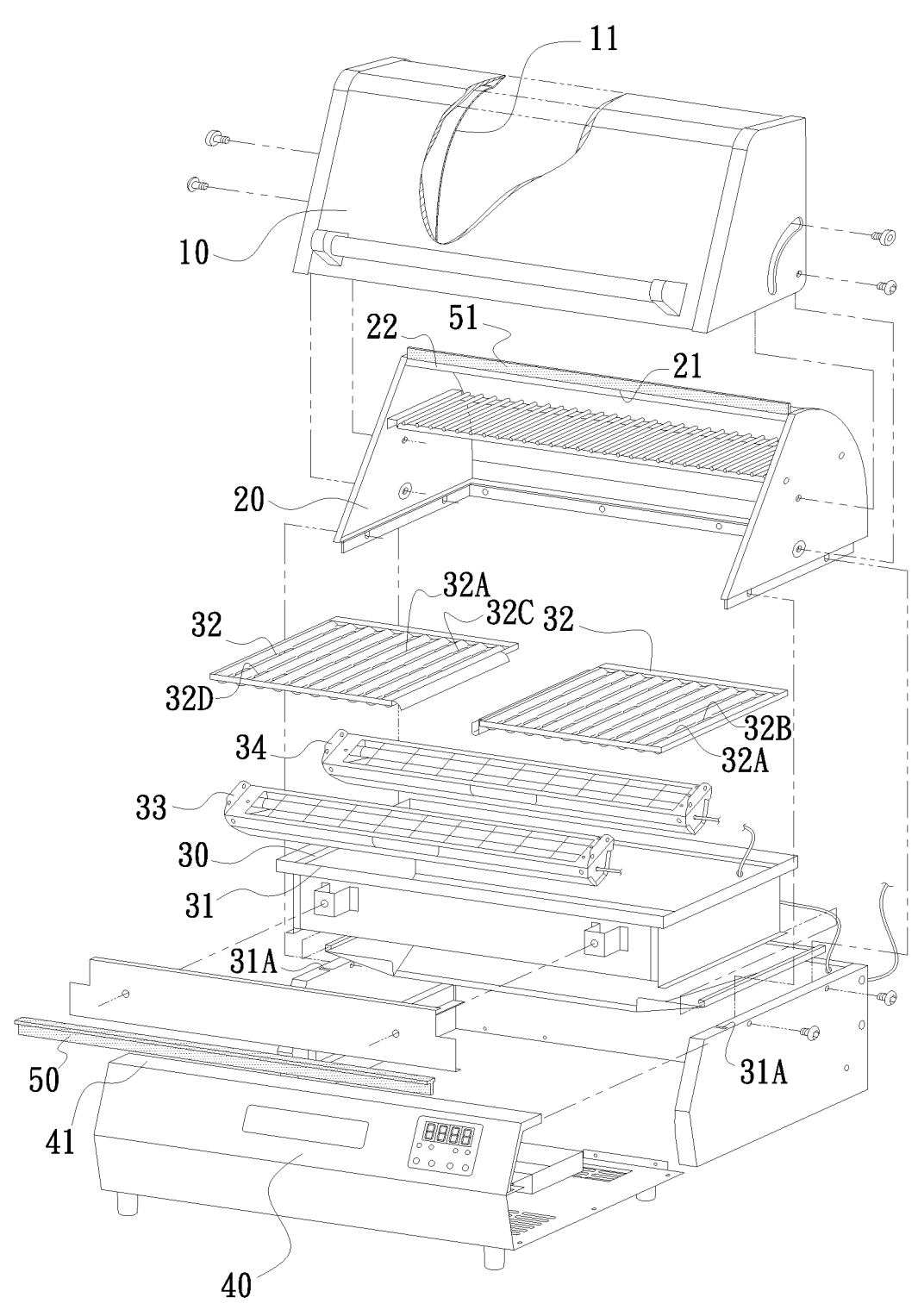
FIG. 2 is an exploded view of FIG. 1.
Figure 3:
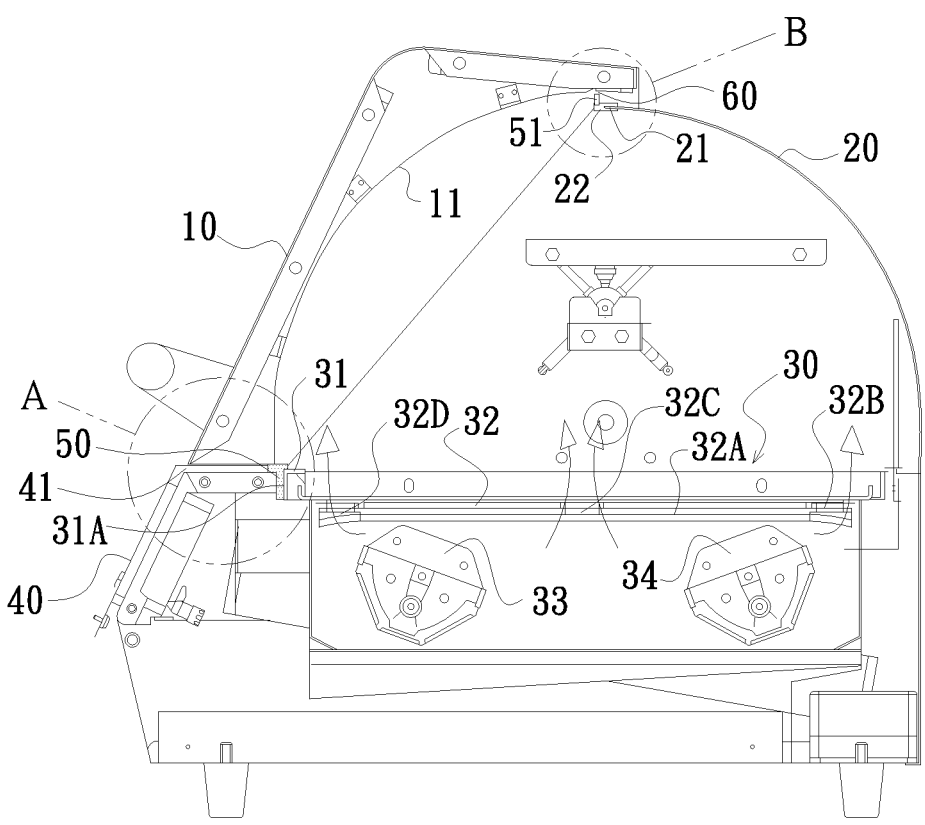
FIG. 3 is a cross-sectional view showing an inside structure of the oven of FIG. 1.

Referring to FIGS. 1-3, the present invention provides a thermal-loss-reduced and temperature-homogenization-effect-enhanced oven, and specifically, the roasting trays 32 are arranged as a single-row straight wavy-pattern heat conduction plate, and the roasting trays 32 comprise wavy pattern troughs 32A. The wavy pattern troughs 32A are formed with a plurality of hot air venting openings 32B, 32C, 32D.

The hot air venting openings 32B, 32C, 32D guide hot air flows to form an air wall between the heating bodies 33, 34 and the oven top 30 to effectively guide thermal energy, reducing temperature conduction of the oven top 30, and compensating a temperature of an area that is not located in a radiating area of the heating bodies 33, 34, where the hot air flow is applied for compensation to achieve a temperature homogenization effect.

In an embodiment of the thermal-loss-reduced and temperature-homogenization-effect-enhanced oven according to the present invention, the first temperature barrier silicon strip 50 is selected as a silicone strip having a T-shaped cross-section and having a lower end tightly inserted into the horizontal gap 31A, with a top end thereof that extends horizontally lodging and fixed outside a top of the horizontal gap 31A, so as to significantly project beyond the oven top front edge 31 and a planar surface of the operation panel top edge 41 adjacent thereto.

In an embodiment of the thermal-loss-reduced and temperature-homogenization-effect-enhanced oven according to the present invention, the second temperature barrier silicon strip 51 is arranged on the fixed rear cover top edge 21 in such a way that a connecting strip 22 that comprises clamping slits 22A, 22B is first fit to the fixed rear cover top edge 21, and then, the second temperature barrier silicon strip 51 is fit into the clamping slit of the connecting strip 22 to project upwards beyond the fixed rear cover top edge 21.

In an embodiment of the thermal-loss-reduced and temperature-homogenization-effect-enhanced oven according to the present invention, the liftable front cover 10 may comprise a lift-movable plate inner-surface curvature for more smoothly fitting on an inner shell layer 11 of the fixed rear cover 20 to guide the hot air inside the closed oven to smoothly and orderly flow around the second temperature barrier silicon strip 51 for releasing outward through the cover top heat release gap 60.

I claim:

1. A thermal-loss-reduced and temperature-homogenization-effect-enhanced oven, comprising:
   a liftable front cover;
   a fixed rear cover, to which the liftable front cover is movably pivoted;
   an oven top, the oven top being arranged below the fixed rear cover, at least one heating body being provided under the oven top, the oven top comprising an oven top front edge and at least one roasting tray; and
   an operation panel, which is arranged at a front side of the oven top;
   wherein a horizontal gap is present between the operation panel and the oven top front edge, and a first temperature barrier silicon strip is arranged in the horizontal gap, an upper surface of the first temperature barrier silicon strip projecting beyond upper surfaces of the operation panel and the oven top front edge;
   a cover top heat release gap is present between the liftable front cover and the fixed rear cover, and a second temperature barrier silicon strip is arranged in the cover top heat release gap and mounted on a fixed rear cover top edge arranged at a top of the fixed rear cover and adjacent to the liftable front cover; and
   the roasting tray comprises a single-row straight wavy-pattern heat conduction plate, and the roasting tray comprises wavy pattern troughs, the wavy pattern troughs being formed with a plurality of hot air venting openings;

wherein a bottom of the liftable front cover is positionable on and pressing against the first temperature barrier silicon strip to define a thermal isolation and sealing structure to reduce heat conducted from the oven top to an operation area of the operation panel to reduce a thermal loss of the oven top, and to effectively reduce an external environmental influence on a front side of the oven to thereby allow the oven top to implement, in an ordered manner, a temperature-increasing operation, while a temperature of the operation panel is kept proper, not burning hand and interfering with operations;
   wherein the second temperature barrier silicon strip reduces the cover top heat release gap between the liftable front cover and the fixed rear cover to reduce a thermal loss and an external environmental influence of the oven to thereby increase a heating efficiency, and wherein an elastic restoration force of the second temperature barrier silicon strip effectively reduces deformation between the liftable front cover and the fixed rear cover caused by a high temperature to thereby avoid excessive tightness in closing the oven cover; and
   wherein the hot air venting openings guide hot airflows to form an air wall between the heating body and the oven top to effectively guide thermal energy, reducing temperature conduction of the oven top, and compensating a temperature of an area that is not located in a radiating area of the heating body, where the hot air flow is applied for compensation to achieve a temperature homogenization effect.

2. The thermal-loss-reduced and temperature-homogenization-effect-enhanced oven according to claim 1, wherein the first temperature barrier silicon strip comprises a silicone strip having a T-shaped cross-section, having a lower end tightly inserted into the horizontal gap, with a top end thereof that extends horizontally lodging and fixed outside a top of the horizontal gap and significantly projects beyond the oven top front edge and a planar surface of the operation panel top edge that are adjacent thereto.

3. The thermal-loss-reduced and temperature-homogenization-effect-enhanced oven according to claim 1, wherein the second temperature barrier silicon strip is arranged on the fixed rear cover top edge by firstly having a connecting strip that comprises clamping slits fit to the fixed rear cover top edge and then having the second temperature barrier silicon strip fit to the clamping slits of the connecting strip to project upwards beyond the fixed rear cover top edge.

4. The thermal-loss-reduced and temperature-homogenization-effect-enhanced oven according to claim 1, wherein the liftable front cover comprise a lift-movable plate inner-surface curvature smoothly fitting on an inner shell layer of the fixed rear cover to guide hot air inside the oven in a closed state to smoothly and orderly flow around a second temperature barrier silicone strip a for releasing outward through the cover top heat release gap.

* * * * *